United States Patent

Hamada

(10) Patent No.: US 7,437,145 B2
(45) Date of Patent: Oct. 14, 2008

(54) WIRELESS CONTROL APPARATUS, SYSTEM, CONTROL METHOD, AND PROGRAM

(75) Inventor: Masashi Hamada, Setagaya-ku (JP)

(73) Assignee: Canon Kabushiki Kaisha, Tokyo (JP)

(*) Notice: Subject to any disclaimer, the term of this patent is extended or adjusted under 35 U.S.C. 154(b) by 409 days.

(21) Appl. No.: 11/290,210

(22) Filed: Nov. 30, 2005

(65) Prior Publication Data

US 2006/0114872 A1   Jun. 1, 2006

(30) Foreign Application Priority Data

Dec. 1, 2004 (JP) .......................... 2004-349030
Oct. 20, 2005 (JP) .......................... 2005-306044

(51) Int. Cl.
*H04Q 7/24* (2006.01)
*H04M 1/66* (2006.01)
*H04L 12/56* (2006.01)
*H04L 12/54* (2006.01)
*G06F 15/177* (2006.01)
*G06F 7/04* (2006.01)

(52) U.S. Cl. ...................... 455/410; 455/410; 455/411; 370/395.75; 370/429; 709/226; 709/220; 726/21

(58) Field of Classification Search ................ 370/338, 370/401, 349, 395.72, 429, 382, 400, 356, 370/254; 713/183, 201, 155; 455/410, 401; 726/21; 380/270; 709/238, 239, 240, 241, 709/242, 220, 224, 222, 245

See application file for complete search history.

(56) References Cited

U.S. PATENT DOCUMENTS

2002/0157007 A1* 10/2002 Sashihara .................. 713/183
2003/0041085 A1   2/2003 Sato
2004/0054926 A1* 3/2004 Ocepek et al. ............. 713/201

FOREIGN PATENT DOCUMENTS

JP   2002-314549 A   10/2002
JP   2003-069573 A   3/2003
JP   2003-249947 A   9/2003

* cited by examiner

*Primary Examiner*—Charles N Appiah
*Assistant Examiner*—Kiet Doan
(74) *Attorney, Agent, or Firm*—Canon U.S.A., Inc. I.P. Division

(57) ABSTRACT

A network system is provided which includes an Enterprise-mode authentication server on a host network, a wireless access point (AP) on a wired local network, and wireless terminals on a wireless local network. The AP obtains a result of user authentication performed by the Enterprise-mode authentication server by monitoring an authentication sequence between the Enterprise-mode authentication server and a wireless terminal that is performing association in a wireless section and obtains information indicating a relationship between a MAC address and an IP address with respect to the wireless terminal by monitoring an ARP table. The AP determines the connection mode of the wireless terminal on the basis of the obtained information and sets a service (e.g., filtering) according to the mode.

8 Claims, 18 Drawing Sheets

FIG. 7

| Attribute Type | |
|---|---|
| User Name (1) | : Login-User Account Name |
| NAS IP Address (4) | : Authenticator IP Address |
| NAS Port (5) | : Authenticator Using Port |
| Called Station ID (30) | : Authenticator MAC Address |
| Calling Station ID (31) | : Login-Device MAC Address |
| Framed MTU (12) | : Frame's Maximum Transmission Unit |
| NAS Port Type (61) | : Login-User Using Medium |
| ........ | ........ |

FIG. 8

| Login-Device MAC Address | Login User Name | Authentication Result | Interconnecting Device Address | Used IP Address | Provided Connection Service | ...... |
|---|---|---|---|---|---|---|
| 0xx022d5429a3 | | | | 192.168.30.1x1 | IP Filtering Restriction | |
| 0xx022d1e10cc | login-user-1@aaa.aaa | Succeeded | 0xx9411bfe14 192.168.30.xxx | 192.168.30.1x2 | No Restriction | |
| 0xx022d2fc43e | | | | 192.168.30.1x3 | IP Filtering Restriction | |
| 0xx022d2fc43e | login-user-2@aaa.aaa | Succeeded | 0xx9411bfe16 192.168.30.xxx | 192.168.30.1x4 | No Restriction | |
| 0xx0b0344098 | login-user-1@ccc.aaa | Failed | 0xx9411bfe14 192.168.30.xxx | | MAC Filtering Restriction | |
| 0xx278f45396 | login-user-3@aaa.aaa | Succeeded | 0xx9411bfe14 192.168.30.xxx | 192.168.30.1x5 | No Restriction | |
| .......... | .......... | .......... | .......... | .......... | .......... | |

FIG. 18

| Login-Device MAC Address | Login User Name | Authentication Result | Interconnecting Device Address | Used IP Address | Provided Connection Service | ...... |
|---|---|---|---|---|---|---|
| 0xx022d5429a3 | | | | 192.168.30.1x1 | Access Permission Only to Specific Terminal | |
| 0xx022d1e10cc | login-user-1@aaa.aaa | Succeeded | 0xx9411bfe14 192.168.30.xxx | 192.168.30.1x2 | No Restriction | |
| 0xx022d2fc43e | | | | 192.168.30.1x3 | Access Permission Only to Specific Terminal | |
| 0xx022d2fc43e | login-user-2@bbb.aaa | Succeeded | 0xx9411bfe16 192.168.30.xxx | 192.168.30.1x4 | Access Restriction to Host Network | |
| 0xx0b0344098 | login-user-1@ccc.aaa | Failed | 0xx9411bfe14 192.168.30.xxx | | MAC Filtering Restriction | |
| 0xx278f45396 | login-user-3@aaa.aaa | Succeeded | 0xx9411bfe14 192.168.30.xxx | 192.168.30.1x5 | No Restriction | |
| ............ | ............ | ............ | ............ | ............ | ............ | |

WIRELESS CONTROL APPARATUS, SYSTEM, CONTROL METHOD, AND PROGRAM

BACKGROUND OF THE INVENTION

1. Field of the Invention

The present invention relates to a wireless control apparatus, a network system, a control method, and a program providing a service to a wireless device.

2. Description of the Related Art

Wireless access points serving to connect wireless local networks to wired local networks have become commercially available in recent years.

Extensible Authentication Protocol (EAP), which is a means of performing authentication of network users to maintain security when the users access servers or the like on networks from wireless devices and permits only a wireless device of a user who has passed the authentication to connect to the networks, has been introduced. Security standards, such as WiFi Protected Access (WPA) and the Institute of Electrical and Electronics Engineers (IEEE) 802.11i, have also been used.

A technique for controlling networks in units of terminals by using an address set in a network management apparatus by employing an IC card to provide a network service to each terminal is disclosed in, for example, U.S. Patent Application Publication No. 2003-041085, corresponding to Japanese Patent Laid-Open No. 2003-069573.

A technique for establishing network connection in units of terminals by dynamically assigning a virtual LAN identifier (VID) to be used in virtual LAN (VLAN) to each of the terminals on the basis of authentication information for each login user on networks is proposed in, for example, Japanese Patent Laid-Open No. 2003-249947.

A technique for maintaining network security by performing user authentication by remotely using an authentication protocol of a wireless access point when a user participates in a network from a wireless terminal is described in, for example, U.S. Patent Application Publication No. 2002-157007, corresponding to Japanese Patent Laid-Open No. 2002-314549.

However, the aforementioned conventional techniques still have some disadvantages. In particular, an administrator is required to preset addresses of devices permitted to connect to a network. Therefore, every time a device permitted to connect to the network is added or changed, the administrator must change the settings.

For a system in which user authentication is performed using an authentication server on a network, the authentication performed by the authentication server is necessary. In a wireless LAN system, both a Home-SOHO mode (a mode that does not use the authentication server) and an Enterprise mode (a mode that uses the authentication server), which are defined by the WPA or IEEE 802.11i standard, may be present. Since the system requiring the authentication performed by the authentication server cannot allow a device operating in the Home-SOHO mode to connect to the network, it is impossible to provide a service to the device that attempts to connect in the Home-SOHO mode.

SUMMARY OF THE INVENTION

The present invention reduces the trouble of presetting to be performed by an administrator to provide a service to each wireless device and facilitates providing services in accordance with the connection mode of each wireless device to a network.

According to an exemplary embodiment, a wireless control apparatus for controlling connection between a wireless local network and a network which includes an authenticating device, obtains information indicating a relationship between a media access control (MAC) address and an internet protocol (IP) address with respect to a wireless device and obtains at least one of information indicating a result of user authentication performed by the authenticating device and information indicating a login name of the wireless device by monitoring an authentication sequence between the wireless device and the authenticating device. The wireless control apparatus includes a determining unit which determines a connection mode of the wireless device to the wireless control apparatus on the basis of the obtained information, and the wireless control apparatus selects a service to be provided to the wireless device in accordance with the determination performed by the determining unit.

Further features of the present invention will become apparent from the following description of exemplary embodiments (with reference to the attached drawings).

BRIEF DESCRIPTION OF THE DRAWINGS

FIG. 7 illustrates an example of attribute information sets of a RADIUS-Access Request message, according to an aspect of the first embodiment of the present invention.

FIG. 8 illustrates an example of a network information table for each wireless client terminal, according to an aspect of the first embodiment of the present invention.

FIG. 18 illustrates an example of a network information table for each wireless terminal, according to an aspect of the second exemplary embodiment of the present invention.

DESCRIPTION OF THE EMBODIMENTS

Exemplary embodiments, features and various aspects of the present invention are now herein described below with reference to the drawings.

First Exemplary Embodiment

Figure 1:
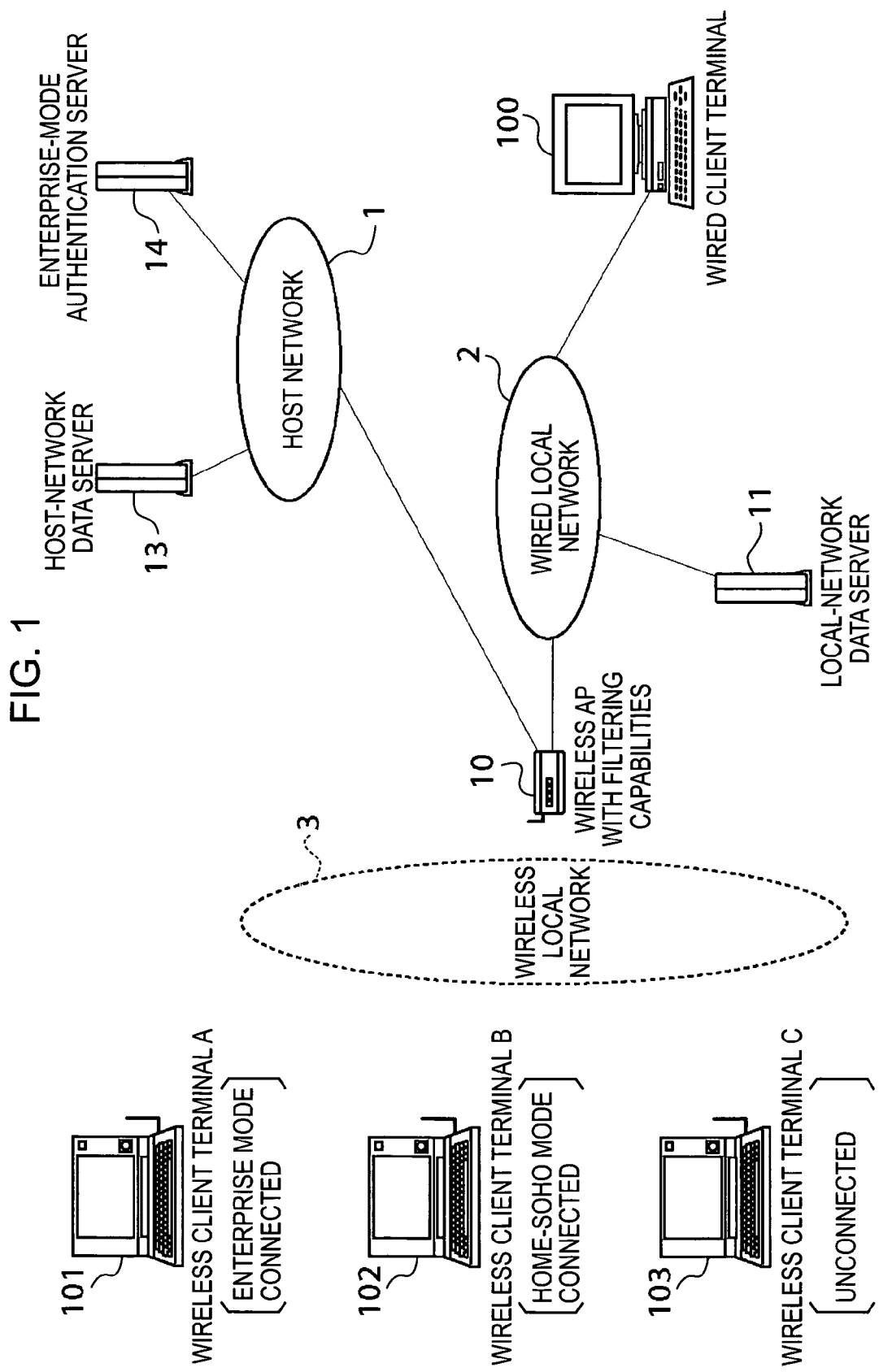
FIG. 1 illustrates an example of a network system according to a first exemplary embodiment of the present invention.

FIG. 1 illustrates an example of a network system according to a first exemplary embodiment of the present invention. A host-network data server 13 and an Enterprise-mode authentication server (RADIUS server) 14 are connected to a host network 1. A wireless access point with filtering capabilities (hereinafter, referred to in abbreviated form as AP) 10, a local-network data server 11, and a wired client terminal 100 are connected to a wired local network 2. A wireless client terminal A 101, a wireless client terminal B 102, a wireless client terminal C 103 are connectable to a wireless local network 3. Hereinafter, the wired client terminal is referred to as the "wired terminal", and the wireless client terminal is referred to as the "wireless terminal".

The host-network data server 13 is typically a file transfer protocol (FTP) server or a hypertext transfer protocol (HTTP) server. The Enterprise-mode authentication server 14 is a server configured to perform authentication on each wireless terminal by following the authentication sequence shown in FIG. 5 which will be discussed later in the specification.

The AP 10 stores an internal database in its memory (not shown). The internal database stores an ARP table and a network information table. The ARP table stores information indicating the relationship between the MAC address and the IP address with respect to a wireless terminal that is performing association in a wireless section. The network information table stores an authentication result (succeeded/failed) for each wireless terminal, identifying information of each login user (e.g., login user name), and the like. The ARP table may be created by the AP 10 examining the relationship between the MAC address and the IP address with respect to a wireless terminal by following the ARP. The ARP table may be created by monitoring a packet used for an examination of the relationship between the MAC address and the IP address performed by another device. The content of the ARP table is reflected in the network information table by the AP 10.

The AP 10 monitors a message of the authentication sequence between a wireless terminal and the Enterprise-mode authentication server 14. The AP 10 obtains a result of user authentication, which is performed before communication association forms, by this monitoring, so that the result is reflected in the network information table. The AP 10 monitors the ARP table and obtains information indicating the relationship between the MAC address and the IP address with respect to a wireless terminal that is performing association in a wireless section. A controller (not shown) of the AP 10 performs various processing shown in the flowcharts shown in FIGS. 9 to 15 in accordance with a control program stored in the memory (not shown).

The local-network data server 11 is an FTP server or the like. The wired terminal 100 is a terminal that connects to the wired local network 2 and receives a service therefrom. The wireless terminal A 101, the wireless terminal B 102, and the wireless terminal C 103 are terminals that connect to the wireless local network 3 and receive services therefrom.

The authentication of a wireless terminal by the Enterprise-mode authentication server 14 is performed before communication association forms on the wireless local network 3. In this exemplary embodiment, the AP 10 uses an IEEE 802.11-series wireless LAN and Bluetooth protocol as a wireless communication medium. However, it is noted that other wireless protocols may also be implemented. As a result of the aforementioned networking architecture, the AP 10 is used under a network system composed of a combination of the host network 1, the wired local network 2, and the wireless local network 3.

Figure 2:
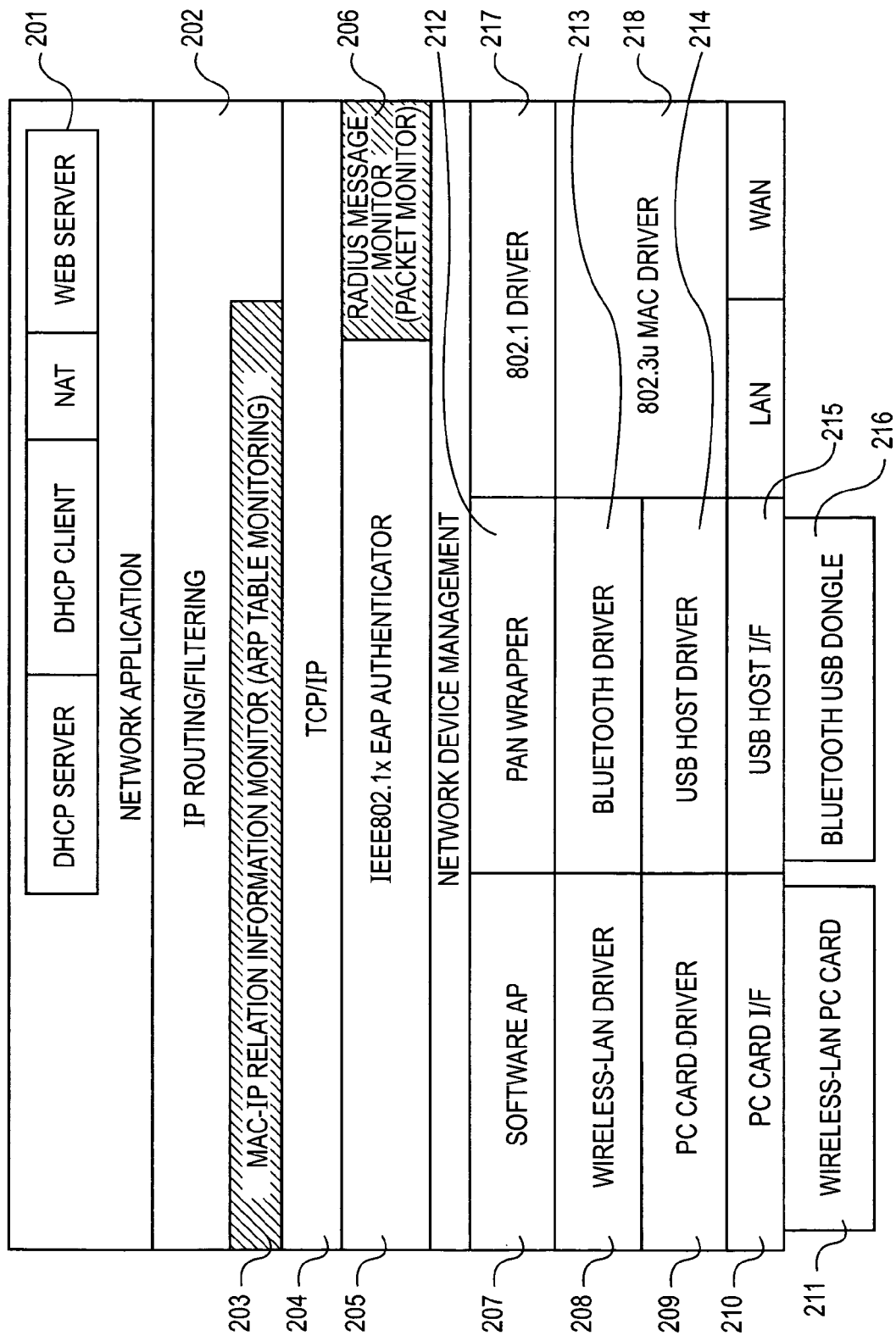
FIG. 2 illustrates a layered functional architecture of a wireless access point with filtering capabilities, according to an aspect of the first embodiment of the present invention.

FIG. 2 illustrates a layered functional architecture of the AP 10. The layered functional architecture monitors the authentication sequence between the AP 10 and the Enterprise-mode authentication server 14 by IP-packet "sniffing" (i.e., monitoring), which is described later in the specification. The layered functional architecture has the structure monitoring the ARP table and collecting information indicating the relationship between a MAC address and an IP address with respect to a wireless terminal that is performing association with the wired local network 2 and the wireless local network 3.

This exemplary embodiment is characterized by a MAC-IP relation information monitor 203 and a RADIUS message monitor (packet monitor) 206 in the layered functional architecture of the AP 10.

A network application 201 functions as a dynamic host configuration protocol (DHCP) server, a DHCP client, a network address translation (NAT), and a web server. NAT is a technique of translating private IP addresses into global IP addresses and vice versa. An IP routing/filtering 202 has the functions of IP routing, IP filtering, and MAC address filtering. The MAC-IP relation information monitor 203 monitors the ARP table and collects information indicating the relationship between a MAC address and IP address with respect to a wireless terminal.

A transmission control protocol/internet protocol (TCP/IP) application 204 serves to data transmission. An IEEE802.1x EAP authenticator 205 functions to block connection from a wireless terminal until the result of user authentication performed by the Enterprise-mode authentication server 14 is determined to be successful. The RADIUS message monitor (packet monitor) 206 monitors authentication messages between a wireless terminal and the Enterprise-mode authentication server 14 and collects information about user accounts, authentication results, and the like.

A software AP 207 manages a wireless LAN driver 208, a PC card driver 209, and a PC card interface (I/F) 210. The PC card I/F 210 serves as an interface to a wireless LAN PC card 211. A personal area network (PAN) wrapper 212 manages a Bluetooth driver 213, a universal serial bus (USB) host driver 214, and a USB host I/F 215. The USB host I/F 215 serves as an interface to a Bluetooth USB dongle 216. An 802.1 driver 217 is a driver supporting the IEEE 802.11 standard. An 802.3u MAC driver 218 is a MAC driver supporting the IEEE 802.3 standard.

Figure 3:
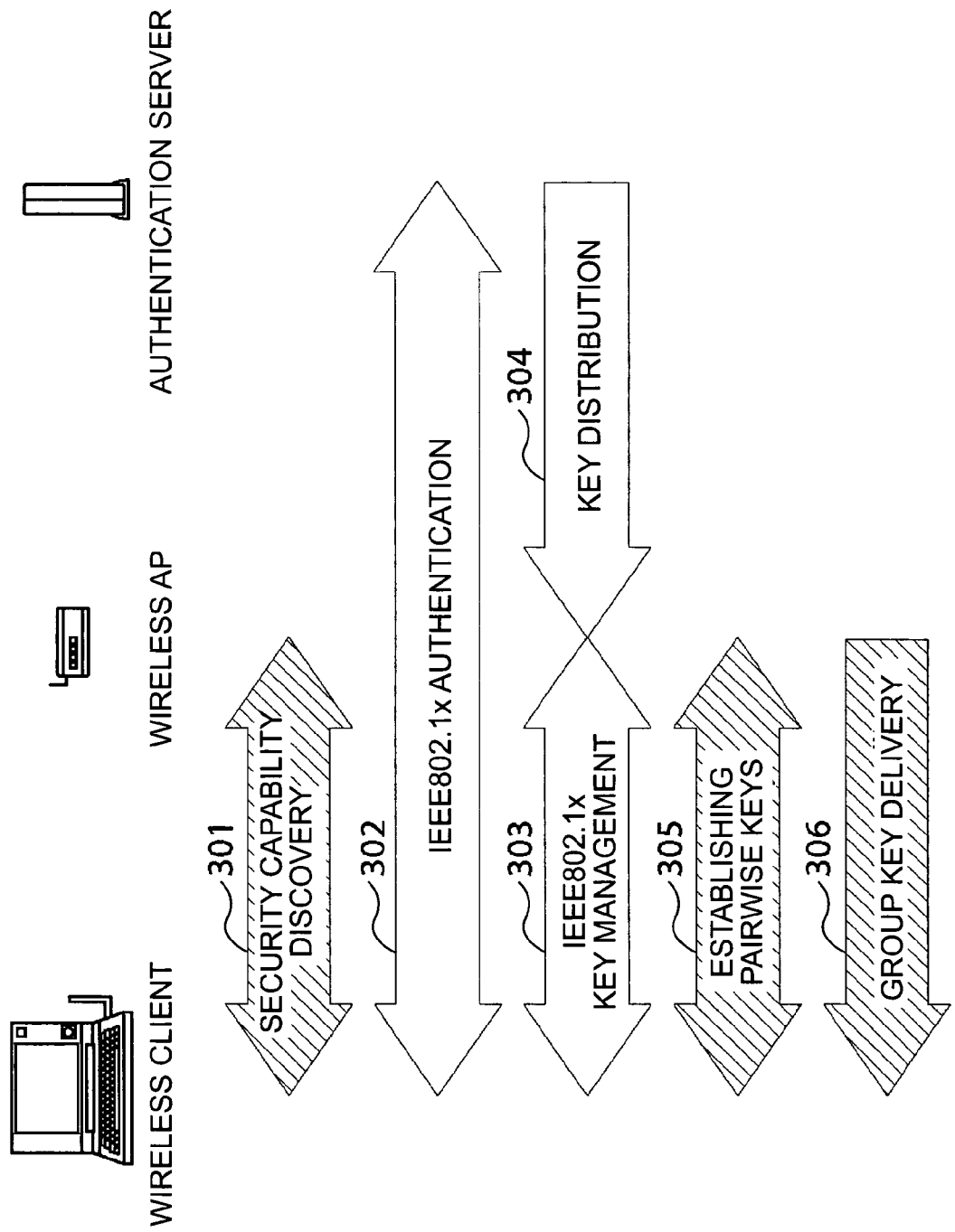
FIG. 3 illustrates processing in the Enterprise mode in the WPA (IEEE 802.11i), according to an aspect of the first embodiment of the present invention.

FIG. 3 illustrates a concept of processing in the Enterprise mode (the mode using the Enterprise-mode authentication server 14) in the WPA (IEEE 802.11i). In security capability discovery 301, the AP 10 notifies a wireless terminal of the determination whether an authentication server is present in a network system in response to an inquiry from the wireless terminal. In IEEE 802.1x authentication 302, the Enterprise-mode authentication server 14 performs authentication on the wireless terminal. In IEEE 802.1x key management 303, the AP 10 performs the settings of a shared secret key distributed by the Enterprise-mode authentication server 14 to the wireless terminal.

In key distribution 304, the Enterprise-mode authentication server 14 distributes the shared secret key to the AP 10. In establishing pairwise keys 305, the AP 10 and the wireless terminal share a cryptographic (encryption) key. In group key delivery 306, the AP 10 distributes a cryptographic key for broadcast communication to the wireless terminal. The IEEE 802.1x authentication 302, the IEEE 802.1x key management 303, and the key distribution 304 occur only when an authentication server is present in a network system.

Figure 4:
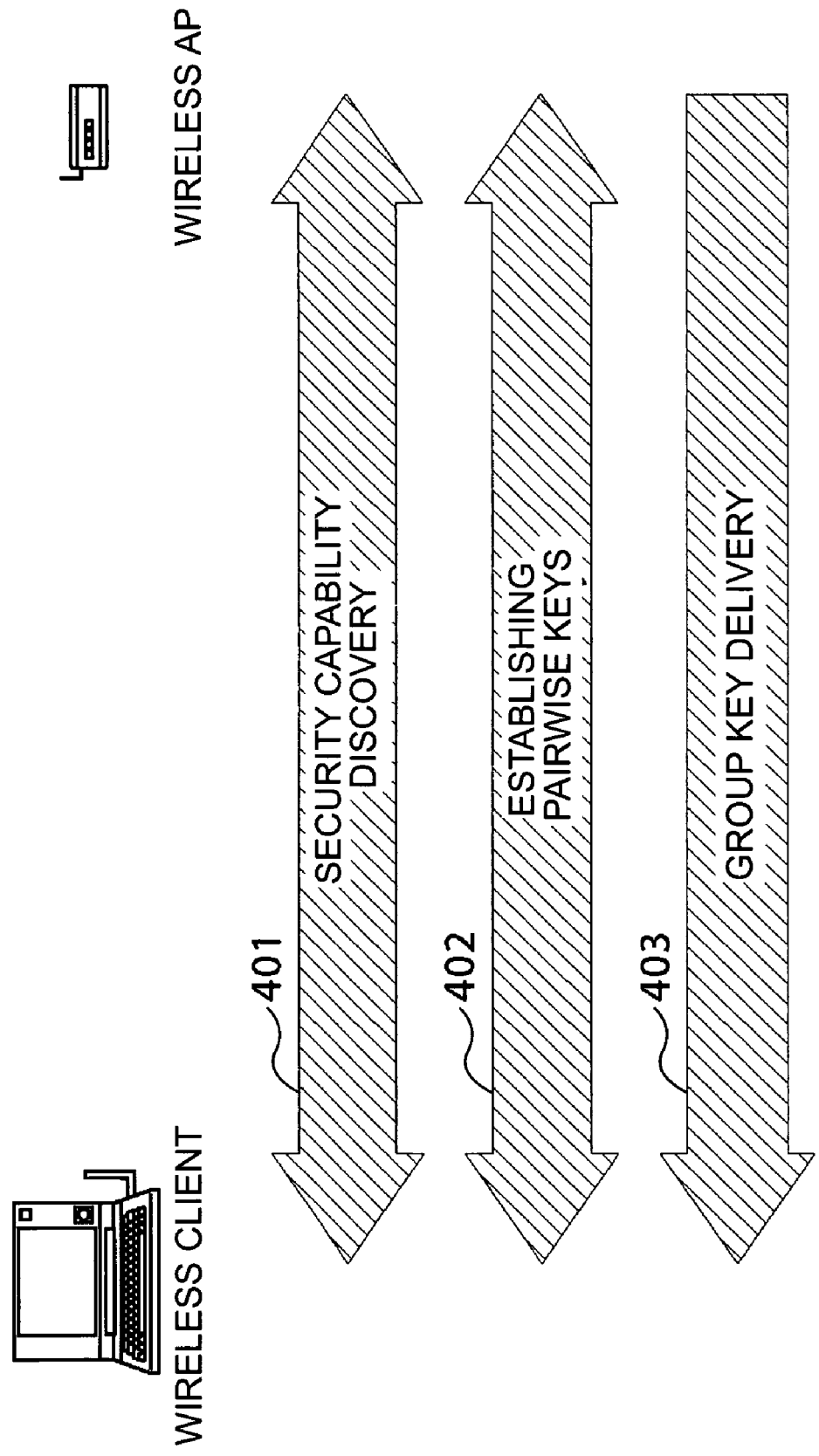
FIG. 4 illustrates processing in the Home-SOHO mode in the WPA (IEEE 802.11i), according to an aspect of the first embodiment of the present invention.

FIG. 4 illustrates a concept of processing in the Home-SOHO mode (the mode not using the Enterprise-mode authentication server 14) in the WPA (IEEE 802.11i). In security capability discovery 401, the AP 10 notifies the wireless terminal that an authentication server is not present in a network system in response to an inquiry from the wireless terminal. In establishing pairwise keys 402, the AP 10 and the wireless terminal share a cryptographic key. In group key delivery 403, the AP 10 distributes a cryptographic key for broadcast communication to the wireless terminal.

Figure 5:
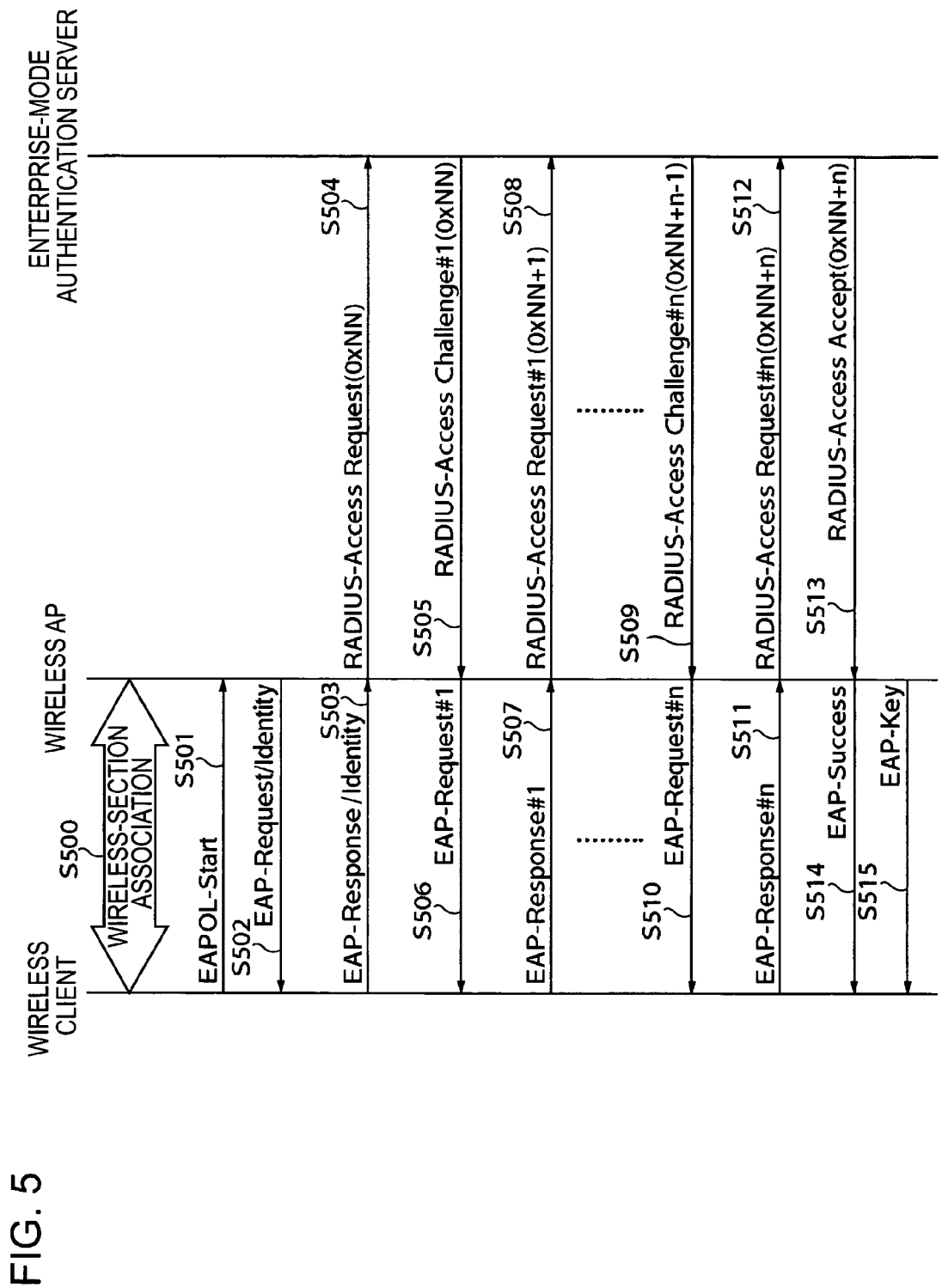
FIG. 5 illustrates an example of a processing sequence of IEEE 802.1x EAP, according to an aspect of the first embodiment of the present invention.

FIG. 5 illustrates an example of a processing sequence of IEEE 802.1x EAP. In particular, FIG. 5 illustrates an example of an authentication sequence occurring when the Enterprise-mode authentication server 14 performs user authentication in a process of processing in the Enterprise mode in the network system shown in FIG. 1. In step S500, association between the wireless terminal and the AP 10 in a wireless section is started. In step S501, the wireless terminal requests the AP 10 to start authentication to the Enterprise-mode authentication server 14 (EAPOL-Start). In step S502, the AP 10 notifies the wireless terminal of receipt of the request to start authentication (EAP-Request/Identity).

In step S503, the wireless terminal sends a response (EAP-Response/Identity) to the AP 10. In step S504, the AP 10 creates an authentication access request (RADIUS-Access Request (0×NN)) in accordance with information contained in the received response (EAP-Response/Identity). The AP 10 then sends the authentication access request (RADIUS-Access Request (0×NN)) to the Enterprise-mode authentication server 14. In step S505, the Enterprise-mode authentication server 14 sends RADIUS-Access Challenge#1 (0×NN) to the AP 10. In step S506, the AP 10 creates EAP-Request#1 in accordance with information contained in the received RADIUS-Access Challenge#1 (0×NN) and then AP 10 sends the EAP-Request#1 to the wireless terminal to request the transmission of information for authentication.

In step S507, the wireless terminal sends EAP-Response#1 to the AP 10 to send authentication information. In step S508, the AP 10 creates RADIUS-Access Request#1 (0×NN+1) in accordance with information contained in the received EAP-Response#1 and then sends RADIUS-Access Request#1 (0×NN+1) to the Enterprise-mode authentication server 14 to send the authentication information received from the wireless terminal.

In step S509, the Enterprise-mode authentication server 14 sends RADIUS-Access Challenge#n (0×NN+n−1) to the AP 10 to request the transmission of the next authentication information. In step S510, the AP 10 sends EAP-Request#n to request the transmission of the next authentication information. In step S511, the wireless terminal sends EAP-Response#n to the AP 10 to send authentication information. In step S512, the AP 10 sends RADIUS-Access Request#n (0×NN+n) to the Enterprise-mode authentication server 14 to send the authentication information received from the wireless terminal.

If the Enterprise-mode authentication server 14 determines that the wireless terminal is authorized after performing authentication by using the authentication information from the wireless terminal, then in step S513, the Enterprise-mode authentication server 14 sends RADIUS-Access Accept (0×NN+n) (authentication acceptance) to the AP 10. In step S514, upon receipt of the RADIUS-Access Accept (0×NN+n) (authentication acceptance), the AP 10 sends EAP-Success (authentication success) to the wireless terminal. In step S515, the AP 10 distributes EAP-key to the wireless terminal.

Figure 6:
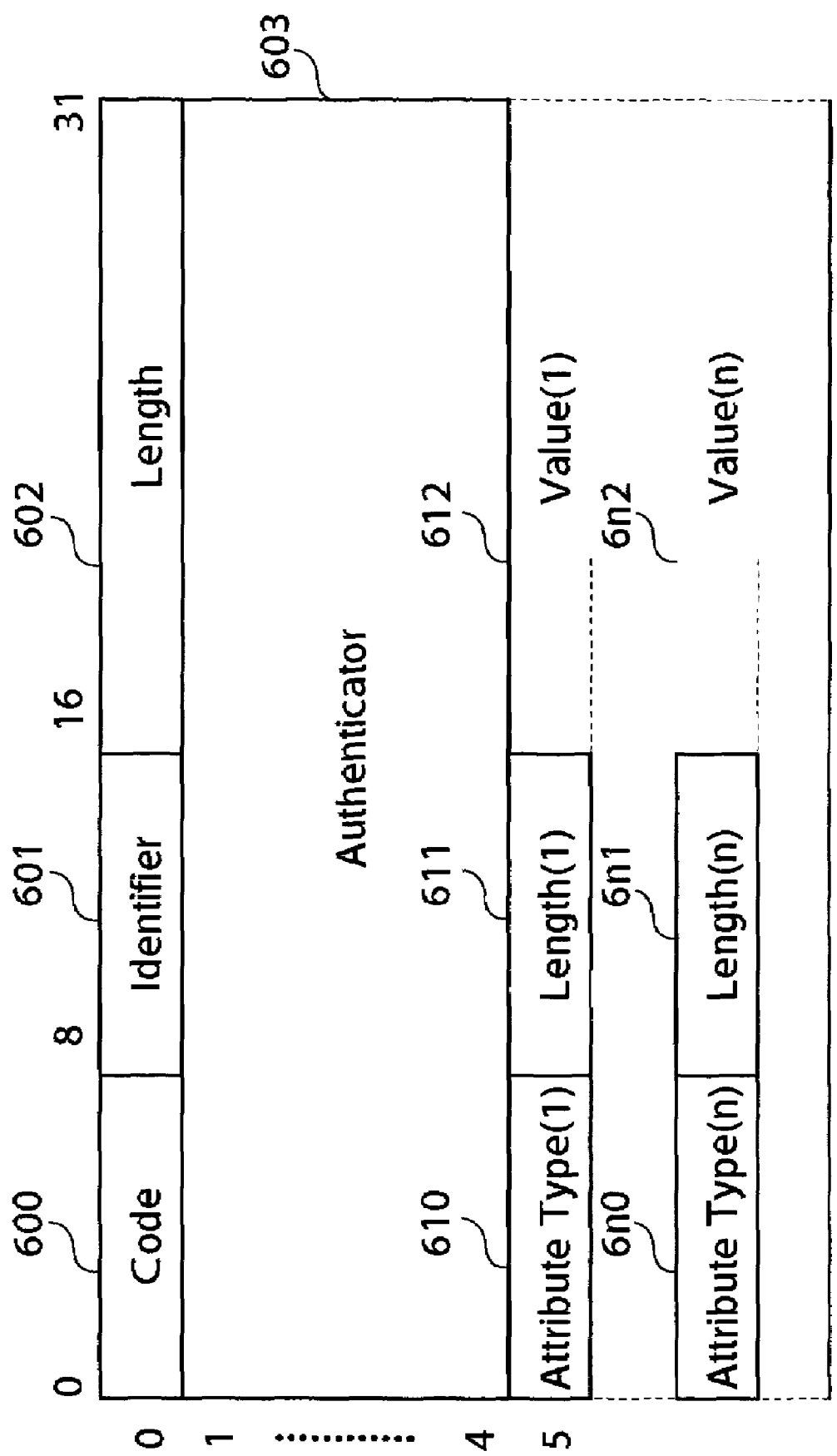
FIG. 6 illustrates an example of a remote authentication dial-in user service (RADIUS) message data format, according to an aspect of the first embodiment of the present invention.

FIG. 6 illustrates an example of a RADIUS message data format. The RADIUS message data format is composed of a RADIUS message code 600, a message-sequence identifier 601, a length 602, an authenticator 603, attribute types (1) 610 to (n) 6n0, lengths (1) 611 to (n) 6n1, and values (1) 612 to (n) 6n2.

FIG. 7 illustrates an example of attribute information sets in the case when the RADIUS message (shown in FIG. 6) is used as a RADIUS-Access Request message. User Name (1) represents a login-user account name (hereinafter, referred to as "login user name"). NAS IP Address (4) represents the IP address of an authenticator. NAS Port (5) represents the port used by the authenticator. Called Station ID (30) represents the MAC address of the authenticator. Calling Station ID (31) represents the MAC address of a login device (wireless terminal). Framed MTU (12) represents the maximum transmission unit of a frame. NAS Port Type (61) represents the medium used by the login user.

[Exemplary Network Information Table]

FIG. 8 illustrates an example of a network information table for each wireless terminal stored in the AP 10. The network information table is created inside the AP 10 in such a way that the MAC address of each wireless terminal connected to the AP 10 is used as an index and that the information described below is used. The network information table stores collected information sets, such as results of authentication of wireless terminals (succeeded/failed), login user names, MAC addresses of login devices, IP addresses used by the login devices, the address of an interconnecting device (the AP 10), and provided connection services, in such a way that they are associated with each other. Examples of information stored as the provided connection services include IP filtering access restriction by using the IP address, MAC address filtering access restriction by using the MAC address, and no access restriction.

In the exemplary embodiment of the network information table shown in FIG. 8, a wireless terminal that has passed authentication performed by the AP 10 while operating in the Home-SOHO mode is not subjected to authentication performed by the Enterprise-mode authentication server 14. As a result, for the wireless terminal in the Home-SOHO mode that has passed authentication by the AP 10, communication in the wireless local network 3 is permitted and communication in the host network 1 and the wired local network 2 is restricted (inhibited). This restriction is realized by IP filtering by using the IP address of a wireless terminal. It also can be realized by MAC filtering by using the MAC address. For a wireless terminal that has passed authentication performed by the Enterprise-mode authentication server 14 while operating in the Enterprise mode, communication in all the host network 1, the wired local network 2, the wireless local network 3 is permitted. For a wireless terminal that has failed to pass authentication performed by the Enterprise-mode authentication server 14 while operating in the Enterprise mode, communication in all the host network 1, the wired local network 2, the wireless local network 3 is restricted (inhibited). In this case, since the wireless terminal would be not assigned an IP address, all communication is restricted by MAC address filtering.

The time at which the network information table is updated can be selected from the time at which the result of user authentication is obtained, the time at which the information indicating the relationship between the MAC address and the IP address is obtained by monitoring the ARP table, and the time at which when the network information table is automatically updated in the AP 10.

[Exemplary Procedures of Updating the Network Information Table]

Exemplary procedures of updating the network information table (shown in FIG. 8) for the wireless clients in the network system having the architecture described above according to the exemplary embodiment is explained below with reference to the flowcharts of FIGS. 9 to 15.

{Exemplary Sniffing (i.e., Monitor)}

Figure 9:
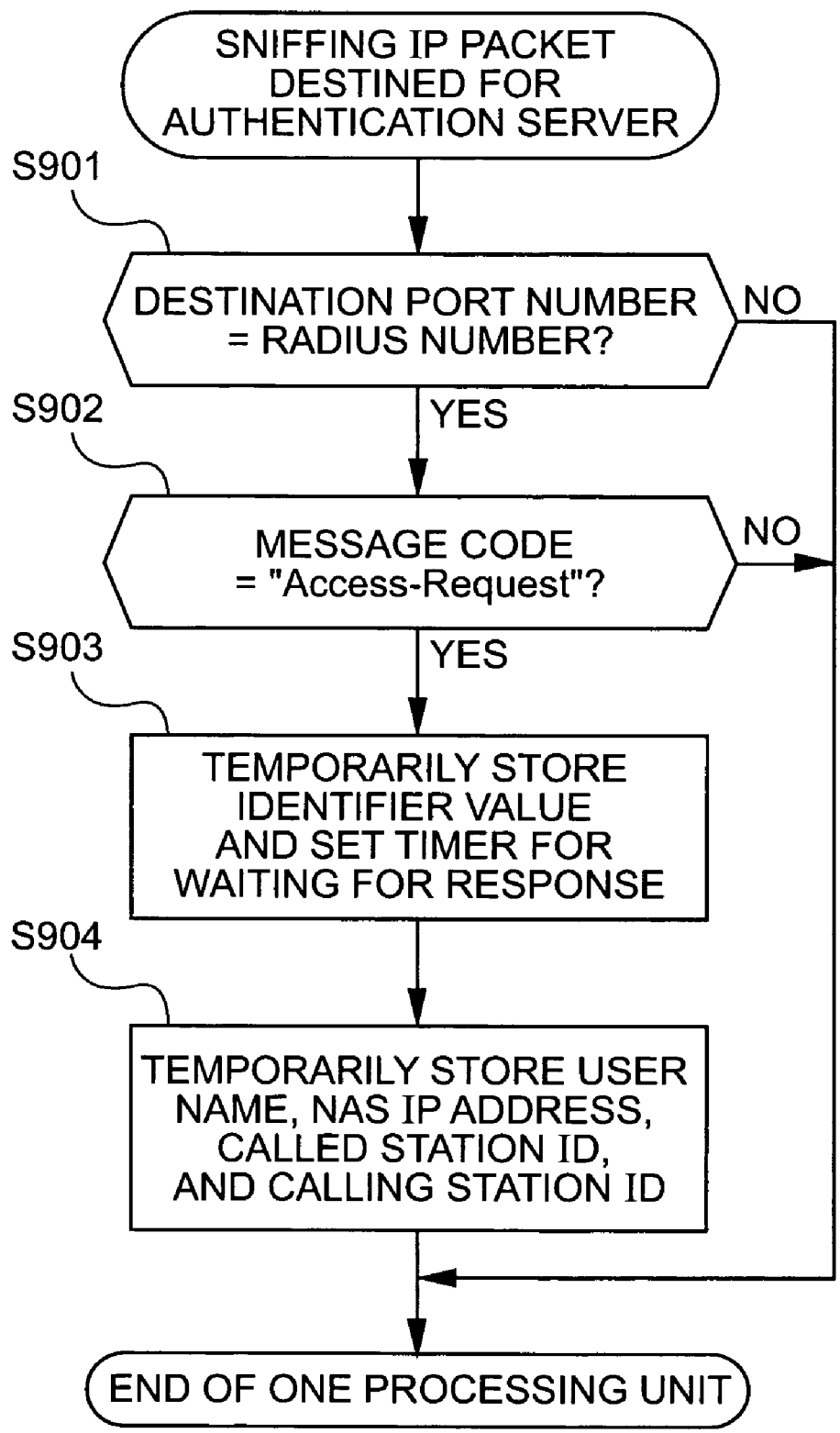
FIG. 9 is a flowchart showing a concept of sniffing (monitoring) IP packets destined for an Enterprise-mode authentication server, according to an aspect of the first embodiment of the present invention.
Figure 10:
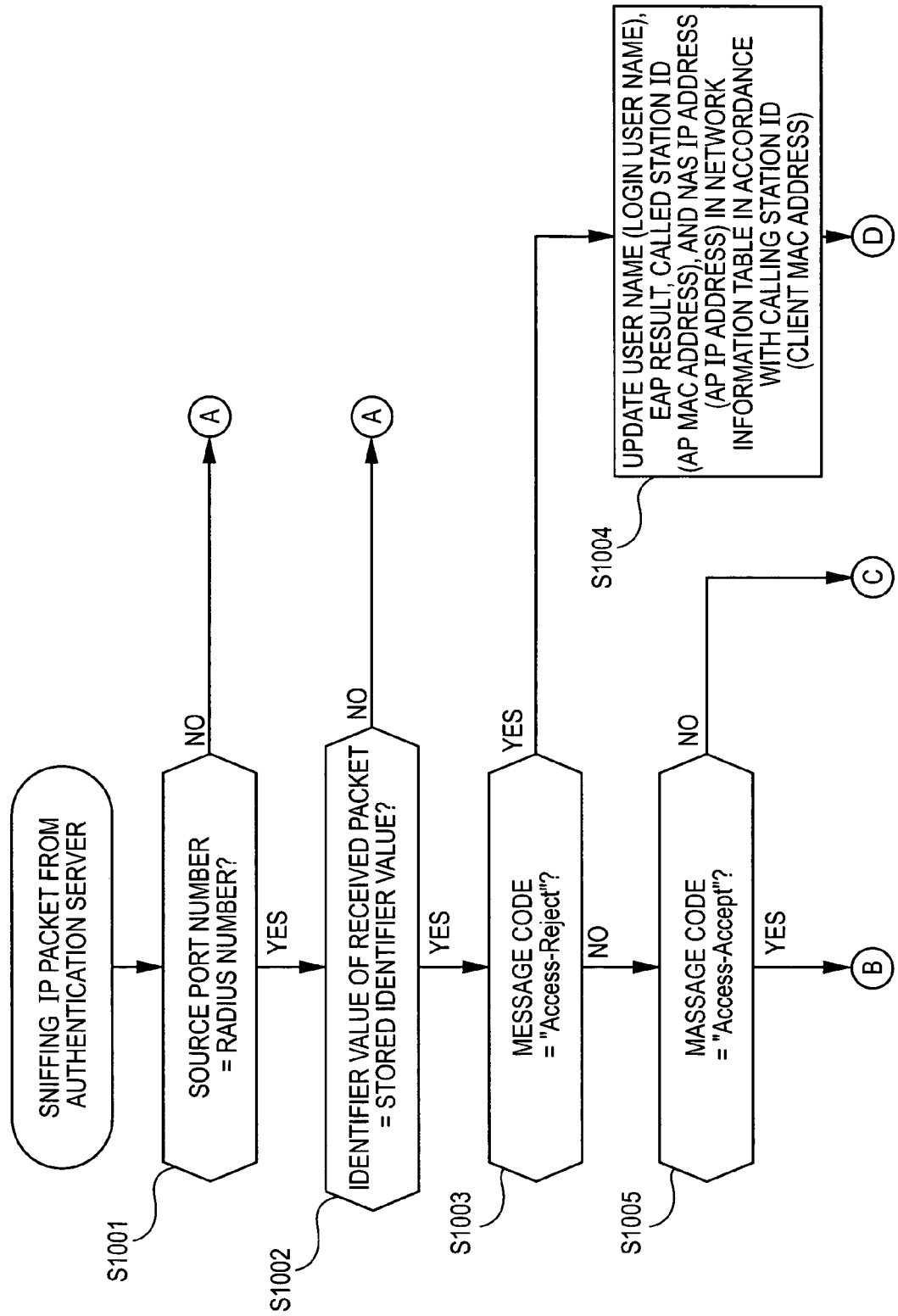
FIGS. 10 and 11 are a flowchart showing a concept of sniffing (monitoring) IP packets originating from the Enterprise-mode authentication server, according to an aspect of the first embodiment of the present invention.
Figure 11:
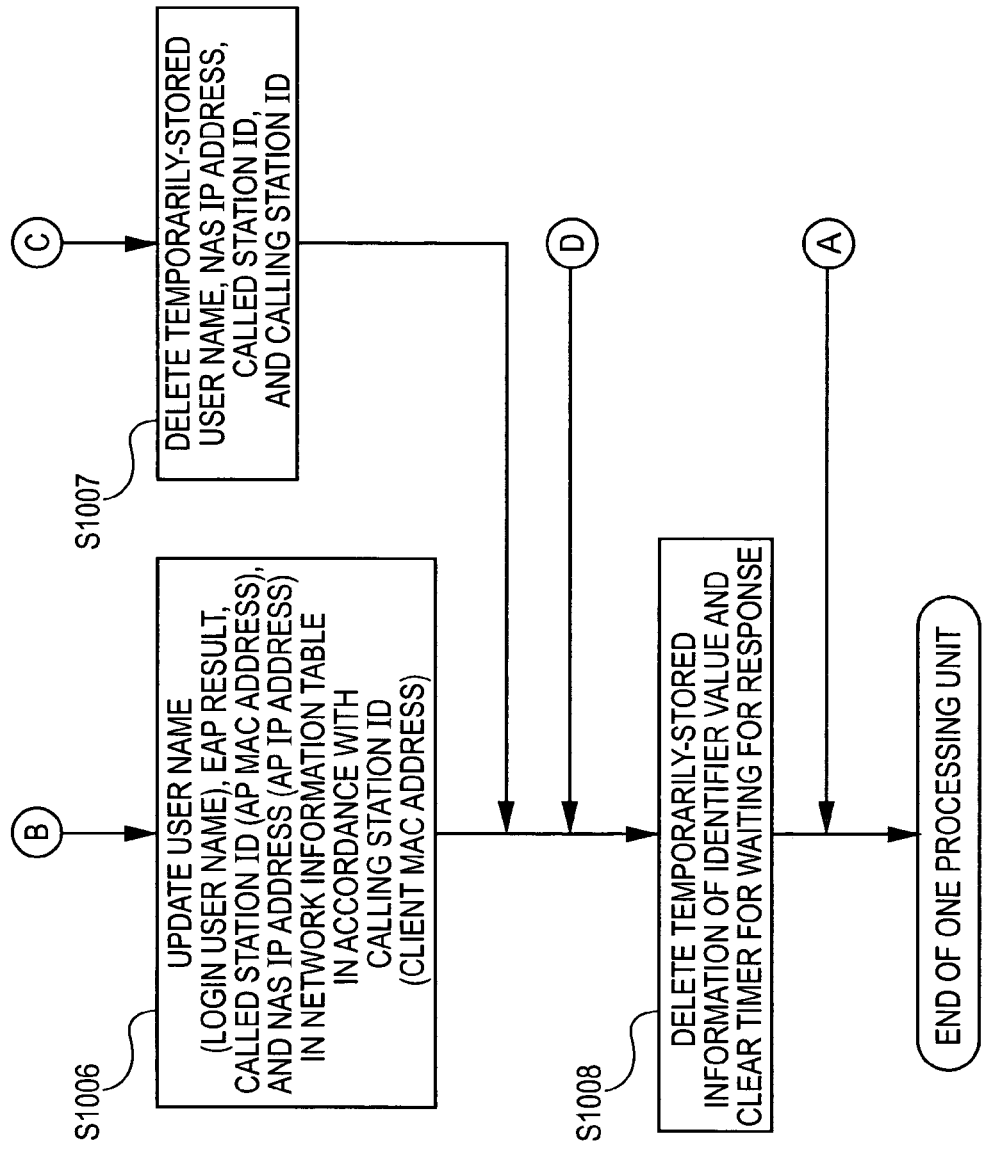

In FIGS. 9 to 11, an IP address assigned to the Enterprise-mode authentication server 14, the IP address being preset in the AP 10, is identified, and an IP packet sent to and from the IP address is subjected to sniffing (interception).

FIG. 9 is a flowchart showing an exemplary process for sniffing (monitoring) IP packets destined for the Enterprise-mode authentication server 14. As described with reference to FIG. 5, the AP 10 creates messages to be sent to the Enterprise-mode authentication server 14 in accordance with various messages sent from the wireless terminal and sends the created messages to the Enterprise-mode authentication server 14. Sniffing IP packets is realized by monitoring information contained in the messages created by the AP 10.

In FIG. 9, the AP 10 compares a destination port number of an IP packet destined for the Enterprise-mode authentication server 14 with a TCP number assigned to the Enterprise-mode authentication server 14, the TCP port number being preset in the AP 10, when receiving the IP packet from the wireless terminal (step S901). If the destination port number of the received packet is not identical with the TCP port number, flow then immediately completes one processing unit.

If the destination port number of the received packet is identical with the TCP port number, the AP 10 determines whether the RADIUS message code 600 of a message to be sent to the Enterprise-mode authentication server 14 is "Access Request" (0x01) (step S902). If the RADIUS message code 600 is not "Access Request" (0x01), flow then immediately completes one processing unit.

If the RADIUS message code 600 is "Access Request" (0x01), the AP 10 temporarily stores the value of the identifier 601, which is the identifier of a RADIUS message sequence, in a work memory (not shown) inside the AP 10. The AP 10 also starts a timer for waiting for a response corresponding to the message (step S903). The timer is a fixed-period timer, in which a predetermined time period is set.

In addition, the AP 10 reads information notified with the message attributes (6nn, shown in FIGS. 6 and 7) in the "Access Request" (0x01) message. The AP 10 temporarily stores the user name (User Name), the address of the interconnecting device (the AP 10) (the IP address of the authenticator (NAS IP Address) and the MAC address of the authenticator (Called Station ID)), the MAC address of the login device (wireless terminal) (Calling Station ID), and the like, in the work memory (step S904).

FIGS. 10 and 11 are flowcharts showing an exemplary process for sniffing (monitoring) IP packets originating from the Enterprise-mode authentication server 14. The processing is performed by the AP 10 in the case when the AP 10 receives an IP packet originating from the Enterprise-mode authentication server 14 before the timer set in step S903 of FIG. 9 expires. The AP 10 compares a source port number of an IP packet from the Enterprise-mode authentication server 14 with a TCP port number assigned to the Enterprise-mode authentication server 14, the TCP port number being preset in the AP 10, when receiving the IP packet (step S1001). If the source port number is not identical with the TCP port number, flow then immediately completes one processing unit (see FIG. 11).

If the source port number is identical with the TCP port number, the AP 10 determines whether the value of the identifier 601, which is the identifier of the message sequence of the received packet, is identical with the value stored in the work memory (step S1002). If the value of the identifier 601 is not identical with the stored value, flow then immediately completes one processing unit (see FIG. 11).

If the value of the identifier 601 is identical with the stored value, the AP 10 determines whether the RADIUS message code 600 of the received packet is "Access-Reject" (0x03) (step S1003). If the RADIUS message code 600 is not "Access-Reject" (0x03), the AP 10 determines whether the RADIUS message code 600 is "Access-Accept" (0x02) (step S1005).

If the RADIUS message code 600 is "Access-Reject" (0x03), the AP 10 updates the information temporarily stored in step S904 of FIG. 9 (step S1004). Similarly, if the RADIUS message code 600 is "Access-Accept" (0x02), the AP 10 updates the information temporarily stored in step S904 of FIG. 9 (step S1006) (see FIG. 11). Specifically, information, such as User Name, the address of the interconnecting device (the AP 10) (NAS IP address and Called Station ID), the MAC address of the login device (Calling Station ID), and the like, that corresponds to the value of the identifier of the received packet is updated in accordance with information contained in "Access-Reject" (0x03) or "Access-Accept" (0x02).

If the RADIUS message code 600 is not "Access-Reject" (0x03) nor "Access-Accept" (0x02), the AP 10 deletes information temporarily stored in the work memory, such as User Name, NAS IP Address, Called Station ID, Calling Station ID, and the like (step S1007) (see FIG. 11). In addition, the AP 10 deletes the temporarily-stored information of the value of the identifier 601, which is the identifier of the received packet, and clears the timer for waiting for a response message (step S1008) and then the process completes one processing unit (see FIG. 11).

{Exemplary Processing that Occurs when the Network Information Table is Updated}

Figure 12:
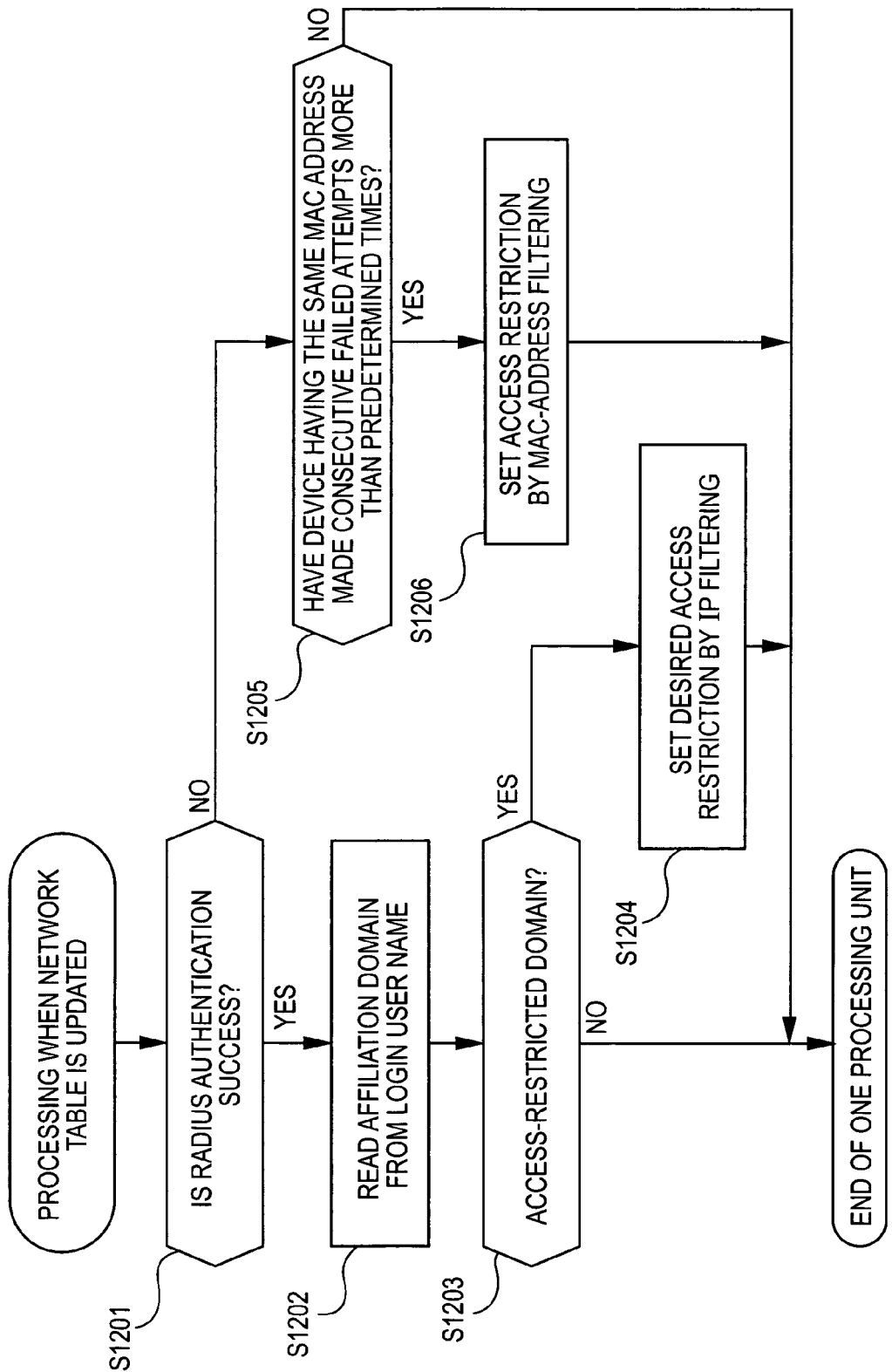
FIG. 12 is a flowchart showing a concept of processing that occurs when a network information table for each wireless client terminal is updated on the basis of information collected by IP packet sniffing, according to an aspect of the first embodiment of the present invention.

The AP 10 performs a determination process shown in FIG. 12 on a login device (wireless terminal, managed on a MAC-address basis) whose information is updated, in the case of the occurrence of the update of the network information table (FIG. 8) for each wireless terminal realized by the IP packet sniffing described above.

FIG. 12 is a flowchart showing an exemplary processing that occurs when the network information table for each wireless client terminal is updated in accordance with information collected by IP packet sniffing. Here, the AP 10 first determines whether a result of RADIUS authentication performed by the Enterprise-mode authentication server 14 is success (step S1201). If the AP 10 determines that the result of RADIUS authentication is successful, the AP 10 reads information indicating an affiliation (authenticating) domain (i.e., information indicating whether the authentication has been performed in LAN or WAN) from the login user name (step S1202). Then, the read information indicating the affiliation (authenticating) domain is compared with information that indicates domains on which access restriction is to be imposed and that is preset in the AP 10 (step S1203).

Then after S1203, if the affiliation (authenticating) domain is not a target for access restriction, the AP 10 imposes no access restriction on the relevant login device (wireless terminal), and flow completes one processing unit. If the affiliation (authenticating) domain is a target for access restriction, the AP 10 sets a condition for the access-restriction preset in the AP 10 in a registration corresponding to the relevant login device (wireless terminal) in the table (step S1204). In this exemplary embodiment, access restriction in an IP packet level by IP filtering is set. After access restriction is set, flow completes one processing unit.

If the RADIUS authentication is determined to be failure in step S1201, the AP 10 determines whether the number of consecutive failed attempts up to the current failure exceeds a predetermined number (step S1205). If the number of failed attempts up to the current failure does not exceed the predetermined number, flow then completes one processing unit. If the number of failed attempts up to the current failure exceeds the predetermined number, the AP 10 performs the settings to reject connection from the relevant login device (step S1206). In this exemplary embodiment, access restriction in a wireless packet level by MAC address filtering is set.

{Exemplary Processing that Occurs when the Timer Expires}

Figure 13:
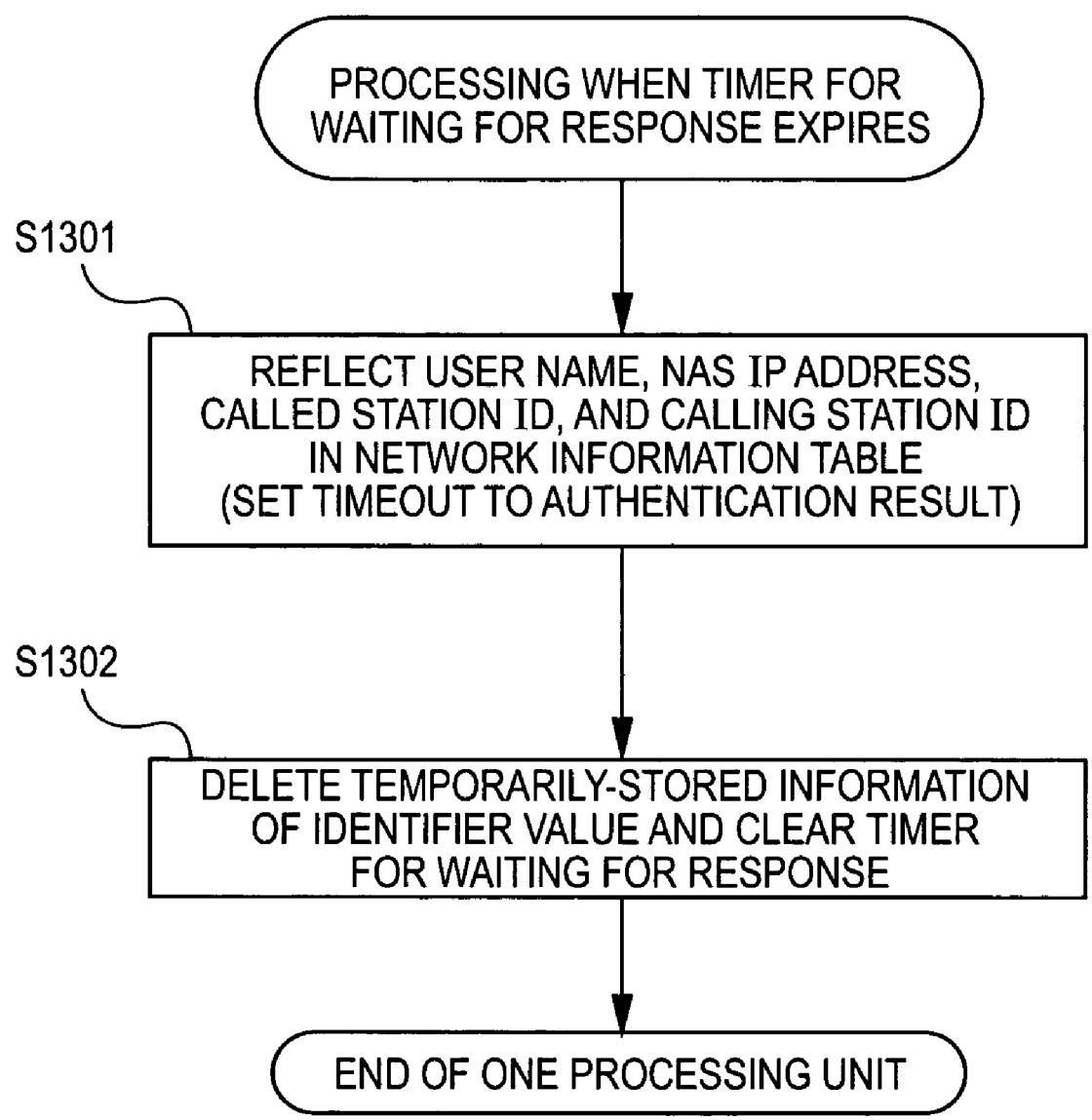
FIG. 13 is a flowchart showing a concept of processing that occurs when a timer for waiting response time from sniffing (monitoring) IP packets destined for the Enterprise-mode authentication server to sniffing (monitoring) IP packets originating from the Enterprise-mode authentication server expires, according to an aspect of the first embodiment of the present invention.

FIG. 13 is a flowchart showing an exemplary processing that occurs when the timer for waiting response time from sniffing (monitoring) IP packets destined for the Enterprise-mode authentication server to sniffing IP packets originating from the Enterprise-mode authentication server expires. The AP 10 performs the processing when the timer for waiting for a response message set in step S903 of FIG. 9 expires.

First, the AP 10 reflects in the network information table various information sets temporarily stored in the work memory and updates the network information table so that the relevant login device is set as an authentication time-out terminal (step S1301). Specifically, User Name, NAS IP Address, Called Station ID, Calling Station ID, and the like, that are temporarily stored in step S904 of FIG. 9 are reflected in the network information table. Next, the AP 10 deletes the temporarily stored information of the value of the message-sequence identifier 601, which is the identifier of the message sequence of the received packet, and clears the timer for waiting for a response message (step S1302). Flow then completes one processing unit.

{Exemplary Processing that Occurs with Respect to MAC Addresses}

Figure 14:
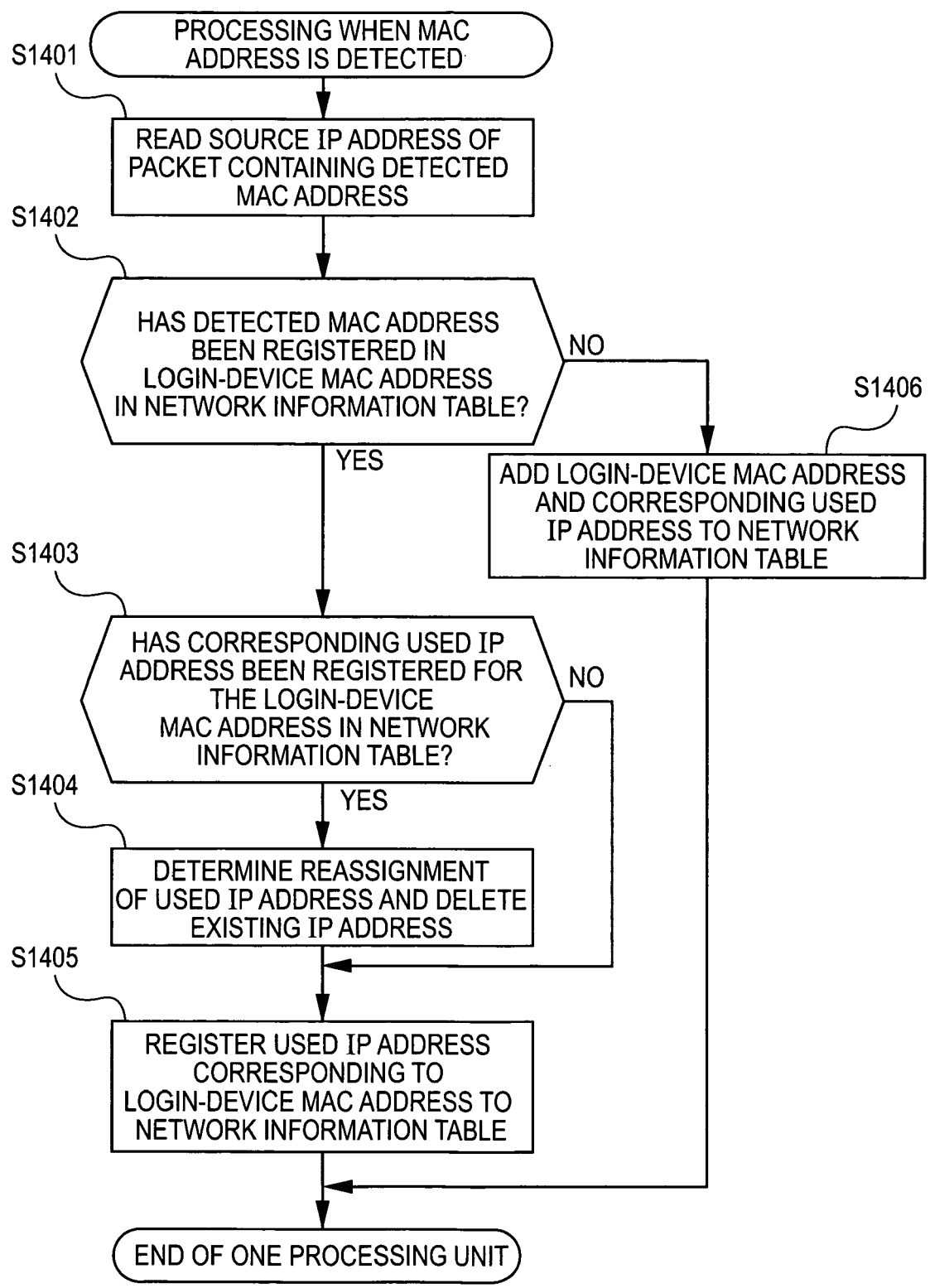
FIG. 14 is a flowchart showing a concept of processing that occurs when a new MAC address is detected or the existing MAC address is re-detected by monitoring an address resolution protocol (ARP) table, according to an aspect of the first embodiment of the present invention.

FIG. 14 is a flowchart showing exemplary processing that occurs when a new MAC address is detected or the existing MAC address is re-detected by monitoring the ARP table. Initially, the AP 10 reads a source IP address of a packet containing the detected MAC address from the ARP table (step S1401). Then, the AP 10 determines whether the detected MAC address has been registered as the MAC address of the login device in the network information table (shown in FIG. 8) for each wireless terminal (step S1402).

If the detected MAC address has not been registered, the AP 10 adds information indicating the relationship between the MAC address of the login device and the corresponding used IP address to the network information table (shown in FIG. 8) for each wireless terminal (step S1406). After step S1406, flow completes one processing unit.

If the detected MAC address has been registered, the AP 10 determines whether the used IP address corresponding to the detected MAC address has been registered for the MAC address of the login device in the network information table (step S1403).

If the used IP address has not been registered, flow then goes to step S1405. If the used IP address has been registered, the AP 10 determines that the used IP address has been reassigned and deletes the registration of the existing IP address (step S1404), and flow then goes to step S1405. In step S1405, the IP address read in step S1401 is registered as the used IP address corresponding to the MAC address of the login device in the network information table (step S1405). After step S1405, flow completes one processing unit.

{Exemplary Processing that Occurs when the Network Information Table is Updated}

Figure 15:
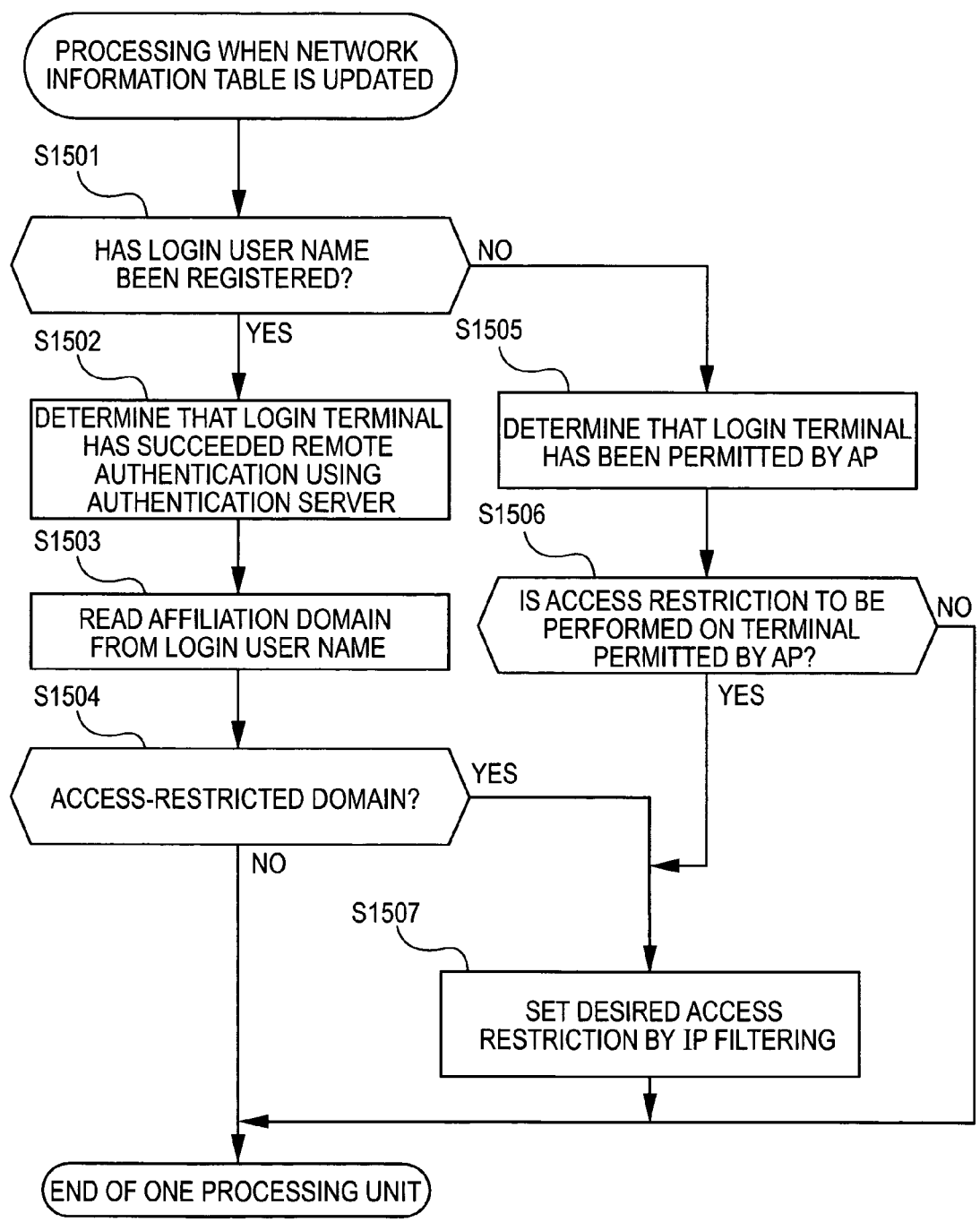
FIG. 15 is a flowchart showing a concept of processing that occurs when a network information table for each wireless terminal is updated on the basis of information collected by monitoring the ARP table, according to an aspect of the first embodiment of the present invention.

The AP 10 then performs a determination process shown in FIG. 15 on a login device (wireless terminal, managed on a MAC-address basis) whose information is updated in the case of the occurrence of the update of the network information table (shown in FIG. 8) for each wireless terminal realized by monitoring of the ARP table described above.

FIG. 15 is a flowchart showing an exemplary processing that occurs when the network information table for each wireless terminal is updated by the processing shown in FIG. 14. Here, the AP 10 first determines whether the login user name has been registered in information corresponding to the MAC address updated in the processing shown in FIG. 14 in the network information table (step S1501). If the login user name has been registered, the AP 10 determines that the processing is address detection of a login device that has passed remote authentication using the Enterprise-mode authentication server 14 (step S1502), and step S1503 and the subsequent steps are performed. In other words, in step S1502, the processing is determined to be address detection of the wireless terminal operating in the Enterprise mode defined by the IEEE 802.11i standard, the WPA standard, or the like.

If the login user name has not been registered, the AP 10 determines that the processing is address detection of a login device that has been permitted to connect by the AP 10 (step S1505), step S1506 and the subsequent steps are performed. In other words, in step S1505, the processing is determined to be address detection of the wireless terminal operating in the Home-SOHO mode defined by the IEEE 802.11i standard, the WPA standard, or the like. The determination whether the login user name has been registered in step S1501 may be replaced with the determination whether the result of authentication performed by the Enterprise-mode authentication server 14 has been registered. In this case, if the authentication result has been registered, the processing is determined to be address detection of a login device that has passed remote authentication performed by the Enterprise-mode authentication server 14 (in step S1502). If the authentication result has been not registered, the processing is determined to be address detection of a login device that has been permitted to connect by the AP 10 (in step S1505).

In step S1503, the AP 10 reads information indicating an affiliation (authenticating) domain from the login user name in the network information table (step S1503). Then, the read information indicating an affiliation (authenticating) domain is compared with information that indicates domains on which access restriction is to be imposed and that is preset in the AP 10 (step S1504).

If the affiliation (authenticating) domain is not a target for access restriction, the AP 10 imposes no access restriction on the relevant login device (wireless terminal), and then flow completes one processing unit. If the affiliation (authenticating) domain is a target for access restriction, the AP 10 sets a condition for access restriction preset in the AP 10 in a registration corresponding to the relevant login device (wireless terminal) in the table (step S1507). In this exemplary embodiment, access restriction in an IP packet level by IP filtering is set.

In step S1506, the AP 10 determines whether the settings preset in the AP 10 indicate that access restriction is to be performed on the login device permitted to connect by the AP 10. If the settings indicate that no access restriction is to be performed on the relevant login device, the AP 10 imposes no access restriction, and flow then completes one processing unit. If the settings indicate that access restriction is to be performed, the AP 10 sets a condition for access restriction present in the AP 10 in a registration corresponding to the relevant login device (wireless terminal) in the table (step S1507). In this exemplary embodiment, access restriction in an IP packet level by IP filtering is set.

As described above, in the exemplary embodiment, messages of an authentication sequence between the Enterprise-mode authentication server 14 and each wireless terminal are monitored. The network information table is stored in an internal database in such a way that the MAC address of each wireless terminal connected is used as an index. In addition, information indicating the IP address used by the wireless terminal connected is obtained by monitoring the ARP table, and the information is stored in the network information table.

Every time the network information table is automatically updated, the security mode (Enterprise mode or Home-SOHO mode) of a login device (wireless terminal) is determined in accordance with updated information. If the security mode is the Enterprise mode, information indicating an affiliation (authenticating) domain for each login user name is identified, and the settings corresponding to the conditions set in the AP 10 are performed on each login device in accordance with the information indicating the affiliation (authenticating) domain. If the security mode is the Home-SOHO mode, the settings corresponding to the conditions set for a wireless terminal operating in the Home-SOHO mode are performed. Examples of such settings include IP filtering, MAC address filtering, a NAT feature, an IP masquerade feature (a feature of converting private addresses to global addresses), a method for assigning IP addresses, or the like. These settings can be automatically updated in accordance with the conditions set in the AP 10.

Therefore, according to the first exemplary embodiment, the trouble of presetting the MAC address of each device permitted to connect to a network by an administrator can be reduced. In addition, the difficulty in managing each device that connects to the network while operating in the Home-SOHO mode can be reduced. Furthermore, network services can be provided according to the user levels. The AP can support wireless devices that attempt to connect to a network while operating in various connection modes (e.g., Enterprise mode, Home-SOHO mode) and can provide services according to the modes. In addition, the connection mode of each wireless device can be effectively and readily determined.

Second Exemplary Embodiment

Figure 16:
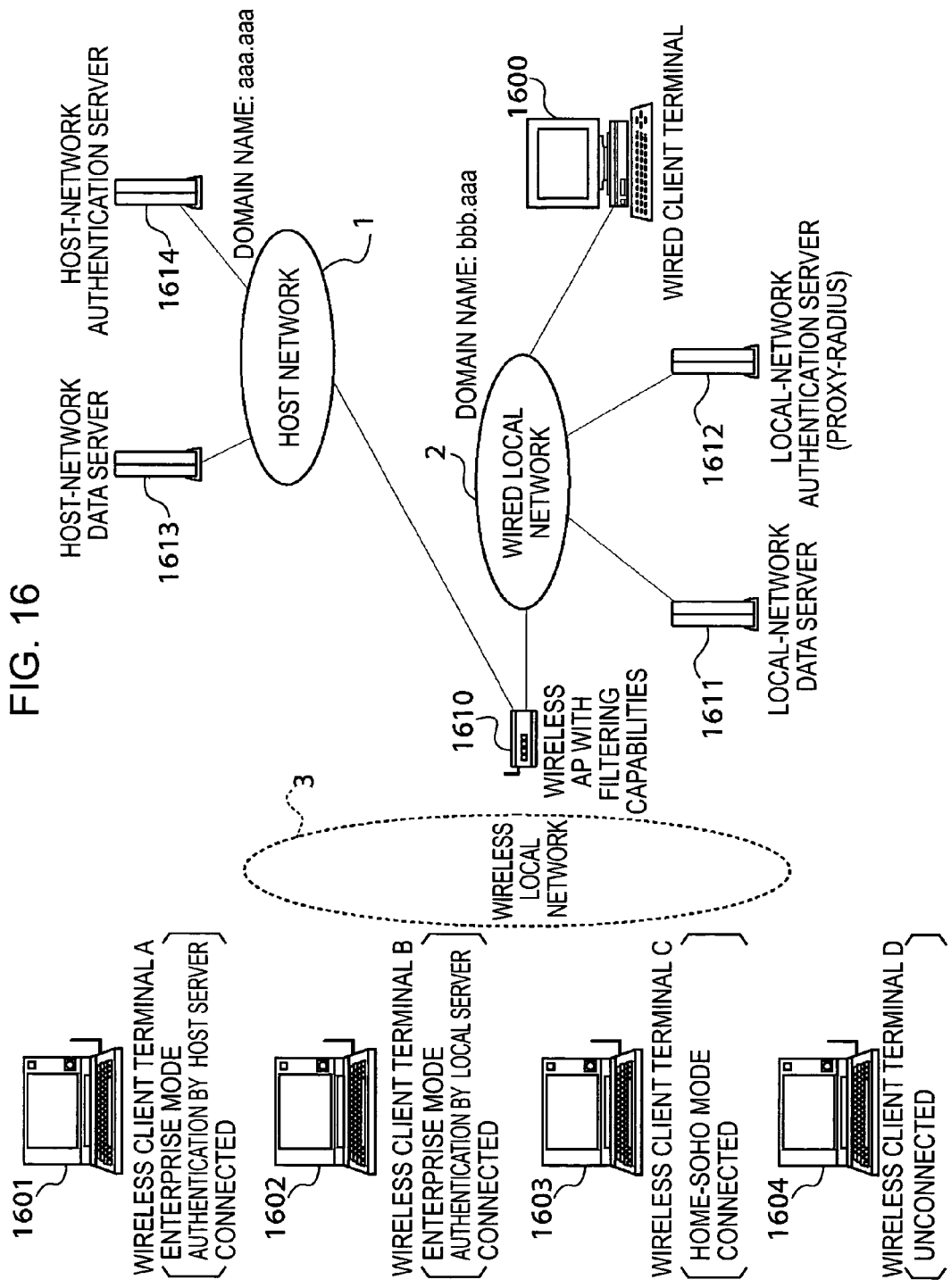
FIG. 16 illustrates an example of a network system, according to an aspect of a second exemplary embodiment of the present invention.

FIG. 16 illustrates an example of a network system according to a second exemplary embodiment of the present invention. A host-network data server 1613 and a host-network authentication server 1614 are connected to a host network 1. A wireless access point with filtering capabilities (hereinafter, referred to in abbreviated form as "AP") 1610, a local-network data server 1611, a local-network authentication server 1612, and a wired client terminal 1600 are connected to a wired local network 2. A wireless client terminal A 1601, a wireless client terminal B 1602, a wireless client terminal C 1603, and a wireless client terminal D 1604 are connectable to a wireless local network 3. Hereinafter, the wireless client terminal is referred to as the "wireless terminal".

In contrast to the first exemplary embodiment, a host-network authentication server 1614 is connected to the host network 1, and a local-network authentication server 1612 is connected to the wired local network 2 in the second exemplary embodiment. The local-network authentication server 1612 is an Enterprise-mode authentication server that has a proxy capability (a capability of controlling communications between two networks) for transferring authentication information to the host network 1. Other elements in this second exemplary embodiment are the same as those (shown in FIG. 1) in the first exemplary embodiment, and the explanation thereof is not repeated here.

Figure 17:
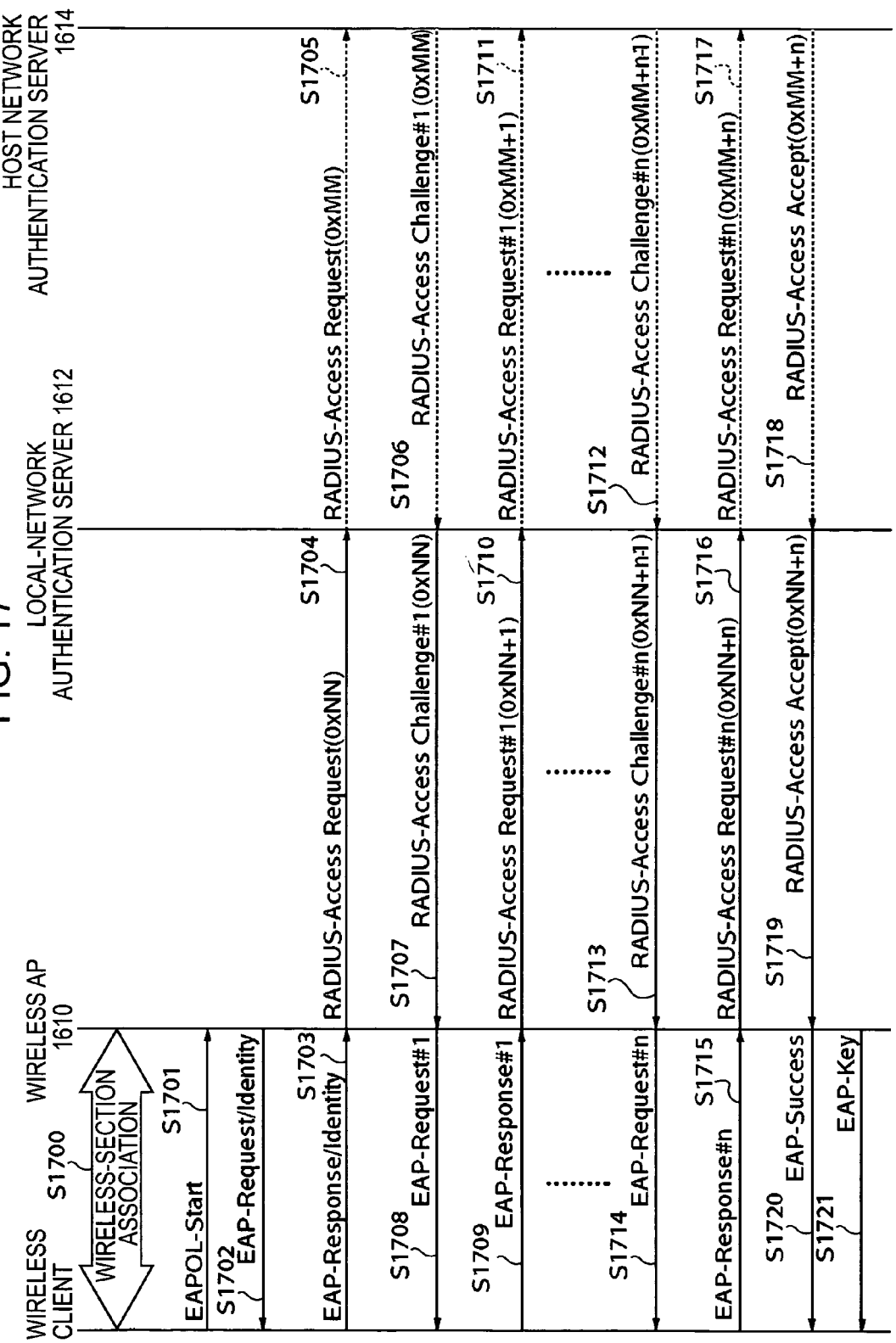
FIG. 17 illustrates an example of a sequence of IEEE 802.1x EAP authentication when the authentication is performed by a host-network authentication server or a local-network authentication server, according to an aspect of the second exemplary embodiment of the present invention.

FIG. 17 illustrates an example of a sequence of IEEE 802.1x EAP authentication when the authentication is performed by the host-network authentication server 1614 or the local-network authentication server 1612. In step S1700, association between the AP 1610 and a wireless terminal (1601-1604, or the like) in a wireless section is started. In step S1701, the wireless terminal requests the AP 1610 to start authentication to the host-network authentication server 1614 (EAPOL-Start). In step S1702, the AP 1610 notifies the wireless terminal of receipt of the request to start authentication (EAP-Request/Identity).

In step S1703, the wireless terminal sends a response (EAP-Response/Identity) to the AP 1610. In step S1704, the AP 1610 creates an authentication access request (RADIUS-Access Request (0×NN)) in accordance with information contained in the received response (EAP-Response/Identity) and then sends the authentication access request (RADIUS-Access Request (0×NN)) to the local-network authentication server 1612. In step S1705, the local-network authentication server 1612 sends an authentication access request (RADIUS-Access Request (0×MM)) to the host-network authentication server 1614 in accordance with the received request (RADIUS-Access Request (0×NN)).

In step S1706, the host-network authentication server 1614 sends RADIUS-Access Challenge#1 (0×MM) to the local-network authentication server 1612. In step S1707, the local-network authentication server 1612 sends RADIUS-Access Challenge#1 (0×NN) to the AP 1610 in accordance with the received RADIUS-Access Challenge#1 (0×MM). In step S1708, the AP 1610 creates EAP-Request#1 in accordance with information contained in the RADIUS-Access Challenge#1 (0×NN) and then sends the EAP-Request#1 to the wireless terminal to request the transmission of information for authentication.

In step S1709, the wireless terminal sends EAP-Response#1 to the AP 1610 to send authentication information. In step S1710, the AP 1610 creates RADIUS-Access Request#1 (0×NN+1) in accordance with information contained in the received EAP-Response#1 and then sends the RADIUS-Access Request#1 (0×NN+1) to the local-network authentication server 1612. In step S1711, the local-network authentication server 1612 sends RADIUS-Access Request#1 (0×MM+1) to the host-network authentication server 1614 in accordance with the received RADIUS-Access Request#1 (0×NN+1).

In step S1712, the host-network authentication server 1614 sends RADIUS-Access Challenge#n (0×MM+n−1) to the local-network authentication server 1612. In step S1713, the local-network authentication server 1612 sends RADIUS-Access Challenge#n (0×NN+n−1) to the AP 1610 in accordance with the received RADIUS-Access Challenge#n (0×MM+n−1) to request the transmission of the next authentication information. In step S1714, the AP 1610 sends EAP-Request#n to the wireless terminal in accordance with the received RADIUS-Access Challenge#n (0×NN+n−1).

In step S1715, the wireless terminal sends EAP-Response#n to the AP 1610 to send authentication information. In step S1716, the AP 1610 sends RADIUS-Access Request#n (0×NN+n) to the local-network authentication server 1612. In step S1717, the local-network authentication server 1612 sends RADIUS-Access Request#n (0×MM+n) to the host-network authentication server 1614.

If the host-network authentication server 1614 determines that the wireless terminal is authorized after performing authentication by using the authentication information received from the wireless terminal and, then in step S1718, the host-network authentication server 1614 sends RADIUS-Access Accept (0×MM+n) (authentication acceptance) to the local-network authentication server 1612. In step S1719, the local-network authentication server 1612 sends RADIUS-Access Accept (0×NN+n) (authentication acceptance) to the AP 1610. In step S1720, the AP 1610 sends EAP-Success (authentication success) to the wireless terminal. And finally, in step S1721, the AP 1610 distributes EAP-key to the wireless terminal.

[Exemplary Network Information Table]

FIG. 18 illustrates an example of a network information table for each wireless terminal stored in the AP 1610. The network information table is created inside the AP 1610 in such a way that the MAC address of each wireless terminal (1601-1604, or the like) is used as an index and that the information described below is used. The network information table stores collected information sets, such as results of authentication of wireless terminals, login user names, MAC addresses of login devices, IP addresses used by the login devices, the address of an interconnecting device (identifying information), and provided connection services, in such a way that they are associated with each other. In this second exemplary embodiment, examples of information stored as provide connection services includes information indicating access restriction or access permission only to a specific terminal, access restriction or access permission only to a specific network (e.g., host network), in addition to the services in the first exemplary embodiment. The first exemplary embodiment may include these services added in the second exemplary embodiment.

The update of the network information table for each wireless terminal shown in FIG. 18 is realized by monitoring messages of an authentication sequence between the host-network authentication server 1614 and the wireless terminal on a WAN interface by using the technique described in the first exemplary embodiment with reference to FIGS. 9 to 15. The network information table is stored in an internal database of the AP 1610 by using the MAC address of each wireless terminal as an index. The used IP address is stored in the internal database in units of MAC addresses of the wireless terminals.

As in the case of the first exemplary embodiment, every time the network information table is automatically updated, the security mode (Enterprise mode or Home-SOHO mode) of a login device (wireless terminal) is determined in accordance with updated information. If the security mode is the Enterprise mode, information indicating an affiliation (authenticating) domain for each login user name is identified, and the settings corresponding to the conditions set in the AP 1610 are performed on each login device in accordance with the information indicating the affiliation (authenticating) domain. If the security mode is the Home-SOHO mode, the settings corresponding to the conditions set for a wireless terminal operating in the Home-SOHO mode are performed. Examples of the settings include IP filtering, MAC address filtering, a NAT feature, an IP masquerade feature, a method for assigning IP addresses, or the like. These settings can be automatically updated in accordance with the conditions set in the AP 1610.

Therefore, according to an aspect of the second exemplary embodiment, the trouble of presetting the MAC address of each device permitted to connect to a network by an administrator can be reduced. In addition, the difficulty in managing each device that connects to the network while operating in the Home-SOHO mode can be reduced. Furthermore, network services can be provided according to the user levels. The AP 1610 can support wireless devices that attempt to connect to a network while operating in various connection modes (e.g., Enterprise mode, Home-SOHO mode) and can provide services according to the modes. In addition, the connection mode of each wireless device can be effectively and readily determined.

Other Exemplary Embodiments

The first and second exemplary embodiments use a network system in which an IEEE 802.11-series wireless LAN and Bluetooth is used as a wireless communication medium and the connection between a host network and wireless local network is controlled by a wireless AP. However, the communication medium is not limited to this form, i.e., it may have another form or protocol, such as another wired or wireless system. Similarly, the connection mode is not limited to the Enterprise mode and the Home-SOHO mode. The present invention is applicable to a network system in which both a first mode of connecting to a network through authentication performed by an authentication server and a second mode of connecting to a network without authentication performed by the authentication server reside.

The present invention can be realized by supplying a storage medium storing program code of a software program for carrying out the functions of the exemplary embodiments to a system or an apparatus and by reading and executing the program code stored in the storage medium by a computer (a central processing unit (CPU), a micro processing unit (MPU), or the like) of the system or the apparatus.

In this case, program code read from a storage medium can realize the functions in the exemplary embodiments. Therefore, a storage medium storing the program code can realize the functions in the exemplary embodiments. Examples of storage media for supplying program code include a flexible disk, a hard disk, an optical disk, a magneto-optical disk (MO), a compact disc read-only memory (CD-ROM), a CD recordable (CD-R), a CD-Rewritable (CD-RW), a digital versatile disk read-only memory (DVD-ROM), a DVD random access memory (DVD-RAM), a DVD–RW, a DVD+RW, magnetic tape, a nonvolatile memory card, a ROM, and the like. Program code may be downloaded via a network.

Executing a read program by a computer can realize the functions of the exemplary embodiments described above. In addition, performing actual processing in part or in entirety by an operating system (OS) running on a computer in accordance with instructions of the program code can realize the functions of the exemplary embodiments described above.

Moreover, program code read from a storage medium is written on a memory included in a feature expansion board inserted into a computer or in a feature expansion unit connected to the computer, and a CPU included in the feature expansion board or the feature expansion unit may perform actual processing in part or in entirety in accordance with instructions of the program, thereby realizing the functions of the embodiment described above.

The program can be supplied directly from a storage medium storing the program or by downloading it from another computer (not shown) or a database connected to the Internet, a commercial network, or a local area network. Further, the program may have any form, such as object code, a program executable by an interpreter, script data to be supplied to an operating system (OS), or some combination thereof.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-349030 filed Dec. 1, 2004 and No. 2005-306044 filed Oct. 20, 2005, which are hereby incorporated by reference herein in their entirety.

What is claimed is:

1. A wireless control apparatus for controlling connection activity between a wireless local network and a network including an authenticating device, the wireless control apparatus comprising:
   a first obtaining unit configured to obtain information indicating a relationship between a MAC address and an IP address with respect to a wireless device;
   a second obtaining unit configured to obtain at least one of information indicating a result of user authentication performed by the authenticating unit and information indicating a login name of the wireless device by monitoring an authentication sequence between the wireless device and the authenticating device;
   a storing unit configured to store the information obtained by the first obtaining unit and the information obtained by the second obtaining unit;
   a determining unit configured to determine a connection mode of the wireless device to the wireless control apparatus depending on whether at least one of the result of user authentication and the login name with respect to the wireless device whose MAC address and IP address have been stored in the storing unit has been stored; and
   a selecting unit configured to select a service to be provided to the wireless device in accordance with a determination performed by the determining unit.

2. The wireless control apparatus according to claim 1, wherein the determining unit is configured to determine whether the connection mode is a first mode of connecting to the wireless control apparatus in accordance with a result of authentication performed by the authenticating device or a second mode of connecting to the wireless control apparatus in accordance with a decision of the wireless control apparatus.

3. The wireless control apparatus according to claim 1, wherein the storing unit is updated when one of the result of user authentication is obtained, the information indicating the relationship between the MAC address and the IP address is obtained, and an internal database of the wireless control apparatus is updated.

4. The wireless control apparatus according to claim 1, wherein the selecting unit is configured to select a setting for at least one of, with respect to the wireless device, an access restriction service, an address translation service, and a method for assigning the IP address.

5. The wireless control apparatus according to claim 1, wherein the selecting unit is configured to select the service on the basis of the connection mode determined by the determining unit and information preset in the wireless control apparatus.

6. A system including an authenticating device; and a wireless control apparatus adapted to control connection activity between a wireless local network and a network having an authenticating device, wherein the wireless control apparatus comprises:
   a first obtaining unit configured to obtain information indicating a relationship between a MAC address and an IP address with respect to a wireless device;
   a second obtaining unit configured to obtain at least one of information indicating a result of user authentication performed by the authenticating device and information indicating a login name of the wireless device by monitoring an authentication sequence between the wireless device and the authenticating device;
   a storing unit configured to store the information obtained by the first obtaining unit and the information obtained by the second obtaining unit;
   a determining unit configured to determine a connection mode of the wireless device to the wireless control apparatus depending on whether at least one of the result of user authentication and the login name with respect to the wireless device whose MAC address and IP address have been stored in the storing unit has been stored; and
   a selecting unit configured to select a service to be provided to the wireless device in accordance with a determination performed by the determining unit.

7. A method for controlling a wireless control apparatus configured to control connection activity between a wireless local network and a network which includes an authenticating device, the method comprising:
   a first obtaining step of obtaining information indicating a relationship between a MAC address and an IP address with respect to a wireless device;
   a second obtaining step of obtaining at least one of information indicating a result of user authentication performed by the authenticating device and information indicating a login name of the wireless device by monitoring an authentication sequence between the wireless device and the authenticating device;

a storing step of storing the information obtained in the first obtaining step and the information obtained in the second obtaining step in a memory;

a determining step of determining a connection mode of the wireless device to the wireless control apparatus depending on whether at least one of the result of user authentication and the login name with respect to the wireless device whose MAC address and IP address have been stored in the memory has been stored; and a selecting step of selecting a service to be provided to the wireless device in accordance with the determined connection mode.

8. A computer readable medium containing computer-executable instructions for controlling a wireless control apparatus configured for controlling connection activity between a wireless local network and a network which includes an authenticating device, the computer readable medium comprising:

computer-executable instructions for obtaining information indicating a relationship between a MAC address and an IP address with respect to a wireless device;

computer-executable instructions for obtaining at least one of information indicating a result of user authentication performed by the authenticating device and information indicating a login name of the wireless device by monitoring an authentication sequence between the wireless device and the authenticating device;

computer-executable instructions for storing the obtained information indicating a relationship between a MAC address and an IP address with respect to a wireless device in a memory, and computer-executable instructions for storing the obtained at least one of information indicating a result of user authentication performed by the authenticating device and information indicating a login name of the wireless device by monitoring an authentication sequence between the wireless device and the authenticating device in the memory;

computer-executable instructions for determining a connection mode of the wireless device to the wireless control apparatus depending on whether at least one of the result of user authentication and the login name with respect to the wireless device whose MAC address and IP address have been stored in the memory has been stored; and computer-executable instructions for selecting a service to be provided to the wireless device in accordance with the determined connection mode.

* * * * *